US007636862B2

(12) United States Patent
Kasprzak et al.

(10) Patent No.: US 7,636,862 B2
(45) Date of Patent: Dec. 22, 2009

(54) MODULAR SERVER SYSTEM

(75) Inventors: Keith Kasprzak, Cedar Park, TX (US); Bharath Vasudevan, Austin, TX (US)

(73) Assignee: Dell Products L.P., Round Rock, TX (US)

(*) Notice: Subject to any disclaimer, the term of this patent is extended or adjusted under 35 U.S.C. 154(b) by 404 days.

(21) Appl. No.: 11/401,076

(22) Filed: Apr. 10, 2006

(65) Prior Publication Data

US 2006/0184811 A1 Aug. 17, 2006

Related U.S. Application Data

(62) Division of application No. 10/136,875, filed on Apr. 30, 2002, now Pat. No. 7,028,195.

(51) Int. Cl.
*G06F 1/26* (2006.01)

(52) U.S. Cl. ........................ 713/310; 713/300; 713/330

(58) Field of Classification Search ................. 713/300, 713/310, 330
See application file for complete search history.

(56) References Cited

U.S. PATENT DOCUMENTS

| | | | | |
|---|---|---|---|---|
| 5,524,249 | A * | 6/1996 | Suboh | 713/322 |
| 6,092,207 | A * | 7/2000 | Kolinski et al. | 713/323 |
| 6,541,879 | B1 * | 4/2003 | Wright | 307/31 |
| 2003/0018921 | A1 * | 1/2003 | Garcia et al. | 713/300 |
| 2003/0200473 | A1 * | 10/2003 | Fung | 713/320 |

* cited by examiner

*Primary Examiner*—Tse Chen
(74) *Attorney, Agent, or Firm*—Baker Botts L.L.P.

(57) ABSTRACT

An information handling system comprises a power supply unit providing a controllable main power supply and a stand-by power supply, a power controller unit receiving the stand-by power supply, and a plurality of sub-systems. Each sub-system comprises a voltage regulator unit being controlled by the power controller unit.

12 Claims, 3 Drawing Sheets

MODULAR SERVER SYSTEM

CROSS-REFERENCE TO RELATED APPLICATIONS

This application is a division of application Ser. No. 10/136,875, filed Apr. 30, 2002 now U.S. Pat. No. 7,028,195, which is incorporated herein by reference.

FIELD OF THE INVENTION

The present invention relates to a computer system, in particular a server system including a plurality of independent sub-systems including a power management control system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today's information handling systems, in particular server systems, comprise often a plurality of sub-systems. Each sub-system can be an independent computer system running its own operating system. For example, a sub-system can comprise a multiple processor architecture running a WINDOWS® operating system. These sub-systems can thus be fully operational computer systems, for example, personal computers or servers which could be coupled with a keyboard, mouse, monitor, etc. However, in particular server sub-systems do not require specific I/O devices as a main or controlling system handles all configuration and operation procedures.

A plurality of those sub-systems can be linked and coordinated through a specific dedicated management bus system or a backplane which can be coupled with an embedded server management controller. To this end, each sub-system comprises a so called bridge to couple with the dedicated bus system. A concern with such systems is often management of the power distribution in such systems. Prior art systems comprise either no power management or each server system comprises an individual power switch. Other modular systems comprise means to individually turn on and off modular elements of a server for power saving reasons, in particular in combination with a so-called sleep modus in which unused modules of a system are shut off if their functionality is not required for a specific period of time. Such a power management system requires significant hardware and software to turn on and off the specific modules. In addition, such a system does not allow the general management of a power distribution within a system comprising a plurality of independent sub-systems.

SUMMARY OF THE INVENTION

Therefore, a need for an improved multiple sub-system server architecture which overcomes the above mentioned problems exists.

A first embodiment of the present invention is an information handling system comprising a power supply unit providing a controllable main power supply and a stand-by power supply, a power controller unit receiving the stand-by power supply, and a plurality of sub-systems. Each sub-system comprises a voltage regulator unit being controlled by the power controller unit.

Another embodiment of the present invention is an information handling system comprising a power supply unit providing a controllable main power supply and a stand-by power supply, a main system including a power controller unit receiving the stand-by power supply, wherein the main system comprises a voltage regulator unit receiving the main power supply being controlled by the power controller unit, and a plurality of sub-systems each comprising a voltage regulator unit receiving the main power supply being controlled by the power controller unit.

The power controller can comprise a microcontroller and/or an I/O unit. The I/O unit may comprise a keypad and/or a display and/or a keyboard. The power controller may monitor activity of the keyboard. Furthermore, a backplane for coupling the power supply unit, the power controller and the plurality of sub-systems may be provided, wherein the backplane may comprise a power supply bus. Each sub-system can be an independent server.

A method of operating an information handling system according to the present invention, wherein the system may comprise a plurality of sub-systems including a voltage regulator module, a power supply unit for providing a main power supply and a stand-by power supply, and a power management controller may provide the steps of:

- upon a sub-system power on request performing the steps of:
  - determining whether the main power supply is available and if not, turning on the main power supply, and
  - enabling the voltage regulator module of the respective sub-system, and
- upon a sub-system power off request performing the steps of:
  - turning off the voltage regulator module of the respective sub-system, and
  - determining whether no other sub-system is enabled and if yes, then turning off the main power supply.

The step of turning off the voltage regulator module may include the step of initiating a power down sequence for the respective sub-system and further comprise the step of waiting until the power down sequence has been completed. The method may further repeating the steps of turning on or off for a pre-defined group of sub-systems, wherein within a sequence of turning off a group of sub-systems, the sequence may be stopped if a sub-system which has been shut down was the last active sub-system and then comprise the step of turning off the main power supply.

Another method of operating an information handling system according to the present invention, wherein the system comprises a plurality of sub-systems including a voltage regulator module, a power supply unit for providing a main power supply and a stand-by power supply, and a power management controller, comprises upon a sub-system power on request the steps of:

determining whether the main power supply is available and if not, turning on the main power supply, and enabling the voltage regulator module of the respective sub-system.

Yet another method of operating an information handling system, wherein the system comprises a plurality of sub-systems including a voltage regulator module, a power supply unit for providing a main power supply and a stand-by power supply, and a power management controller, comprises upon a sub-system power off request the steps of:

turning off the voltage regulator module of the respective sub-system, and determining whether no other sub-system is enabled and if yes, then turning off the main power supply.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
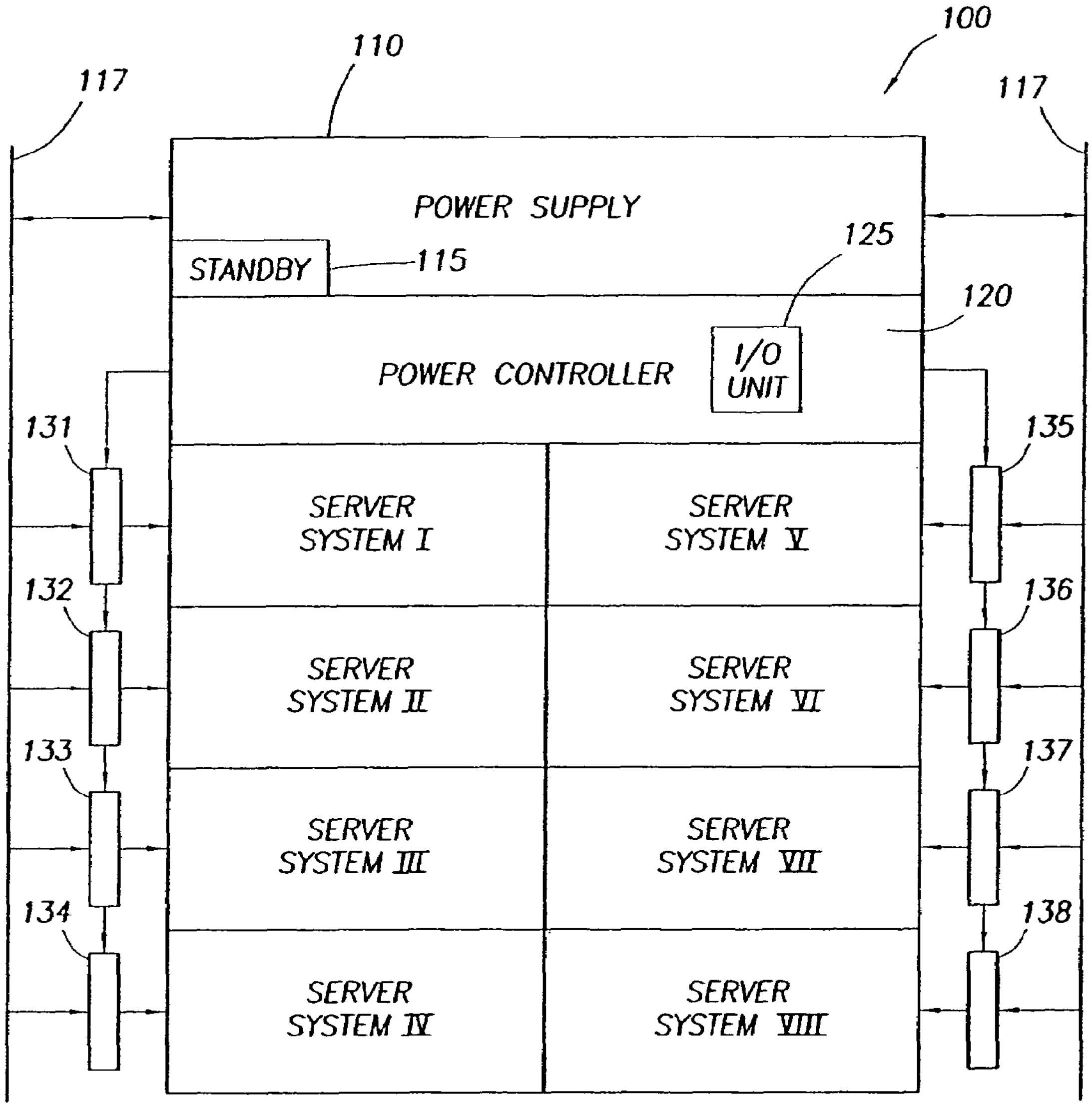
FIG. 1 is a block diagram of an exemplary embodiment according to the present invention.

Turning to the drawings, exemplary embodiments of the present application will now be described. FIG. 1 shows a block diagram of a computer server system 100. Such a system comprises a plurality of server sub-systems I, II, III, IV, V, VI, VII, and VIII. Each sub-system I-VIII can be an independent computer system, such as a personal computer or a single server. The complete system can be integrated in a single chassis as shown in FIG. 1. Such a single chassis 100 comprises a power supply unit 110 for providing a common supply voltage through a power bus 117. Of course, the power supply unit can consist of a plurality of power supply units, for example, if a more than one power supply unit is necessary to provide power for all sub-systems, and is not restricted to a single unit. Power supply unit 110 generates, for example, a relatively high common supply voltage of 45 V which is then converted within each sub-system to standard supply voltages, such as, 5V, ±12V, etc. To this end, each server system I-VIII comprises an associated voltage regulator module 131, 132, 133, 134, 135, 136, 137, and 138. Furthermore, a power controller unit 120 is provided. Power controller unit 120 can comprises preferably a microcontroller for managing the power distribution and control functions. Power controller unit 120 controls functionality of the voltage regulator modules 131-138. Power supply unit 110 further comprises an independent stand-by unit 115 for providing a supply voltage to power controller unit 120. Functionality of power controller unit 120 is, thus, secured even if power supply unit 110 is shut down. For control functions, power controller unit 120 can comprise a I/O unit, for example, a key-pad and a display for displaying status information and for input of control functions by a user or administrator.

If the system is shut down, power supply unit 110 is off and only stand-by unit 115 generates a supply voltage for operation of power controller unit 120. A user or administrator can turn on single server systems individually or a pre-selected group of server systems, or all server systems through I/O unit 125.

Single system turn on/off function:

In this mode, the user can select a single system, for example server V, to be turned on. To this end, a respective function is selected through the keypad of I/O unit 120. Power controller unit 120 then first checks whether power supply unit 110 is already on. In this example, power supply unit is turned off, thus, power controller 120 turns on power supply unit 110 in a first step. Next, power controller unit 120 sends a signal to voltage regulator unit 135 which is associated with server system V through the power control bus. Thus, voltage regulator 135 is turned on and provides all necessary voltages for server system V which now can boot and operate.

To turn off a single server system, the reverse operation takes place. First power controller unit 120 checks whether the respective server system is operating. If yes, then a respective control signal is sent to the respective voltage regulator unit through the control bus. Voltage regulator unit will thus be turned off. Next, power controller unit 120 will check whether any other server system is still running. Only if the shut down server system was the last system, power controller unit 120 will turn off the power supply, as no system requires any supply voltage at this point.

Pre-Selected Group Turn On/Off Function:

This function is similar to the function above. The steps for turning on a single server system is repeated for a pre-selected group of server systems. This functionality is advantageous in embodiments with a high number of server systems and will facilitate power on/off operations. Numerous groups can be defined and stored within the memory of power controller unit 120. Through the display of I/O unit 125 different groups can be displayed to a user for a respective selection. The on/off procedures for these groups are automated according to the above described steps. Due to the intelligent turn on/off function, the groups can overlap without any malfunction. If a server is already on, the power controller will simply skip the respective steps and proceed with the next server of the group. During a power off procedure, the test whether the last server system has been turned off will be only performed after the last server system of the respective group has been turned off. However, as commands can be mixed, a test whether the previously running system was the last running system can be performed after each system has been shut down because only a certain number of systems, less than what the pre-selected group comprises, might have been operating. Thus, if the last operating system has been turned off, the routine can skip the remaining systems of the group and turn off the power supply 110.

Entire System On/Off Function:

This function is a sub-function of the pre-selected group turn on/off function. The pre-selected group simply includes all server systems of the respective chassis. During the turn off function, the step of testing whether the last system has been turned off can be omitted as this command will shut down all server systems. However, as commands can be mixed, a test whether the previously running system was the last running system can be performed after each system has been shut down because only a certain number of systems might have been operating. Thus, if the last operating system has been turned off, the routine can skip the remaining systems of the group and turn off the power supply 110.

The power supply bus 117 can include the control bus controlling voltage regulator modules 131-138 and can be implemented on a back plane. For service purposes, the backplane preferably does not comprise any active components. thus, each server system can comprise the associated voltage regulators as an integrated unit. The power supply bus 117 carries the relatively high supply voltage on one or more supply bus lines as well as the stand-by supply voltage. In addition, the power supply bus can comprise certain control signal lines for communication between the server systems I-VIII, the power supply unit 110 and the power controller unit 120. For example, before turning off a voltage regulator module 131-138, the power controller unit 120 can send a shut down request signal to the respective server system. The respective server system then initiates a shut down routine. Once this routine has been completed the server system returns a respective signal to power controller unit 120. Upon receipt of this confirmation signal, power controller unit 120 turns off the respective voltage regulator module. Likewise, after turning on of a voltage regulator module, power controller unit 120 can send a control signal, for example, a reset signal, to the respective server system upon which the system will boot up.

Figure 2:
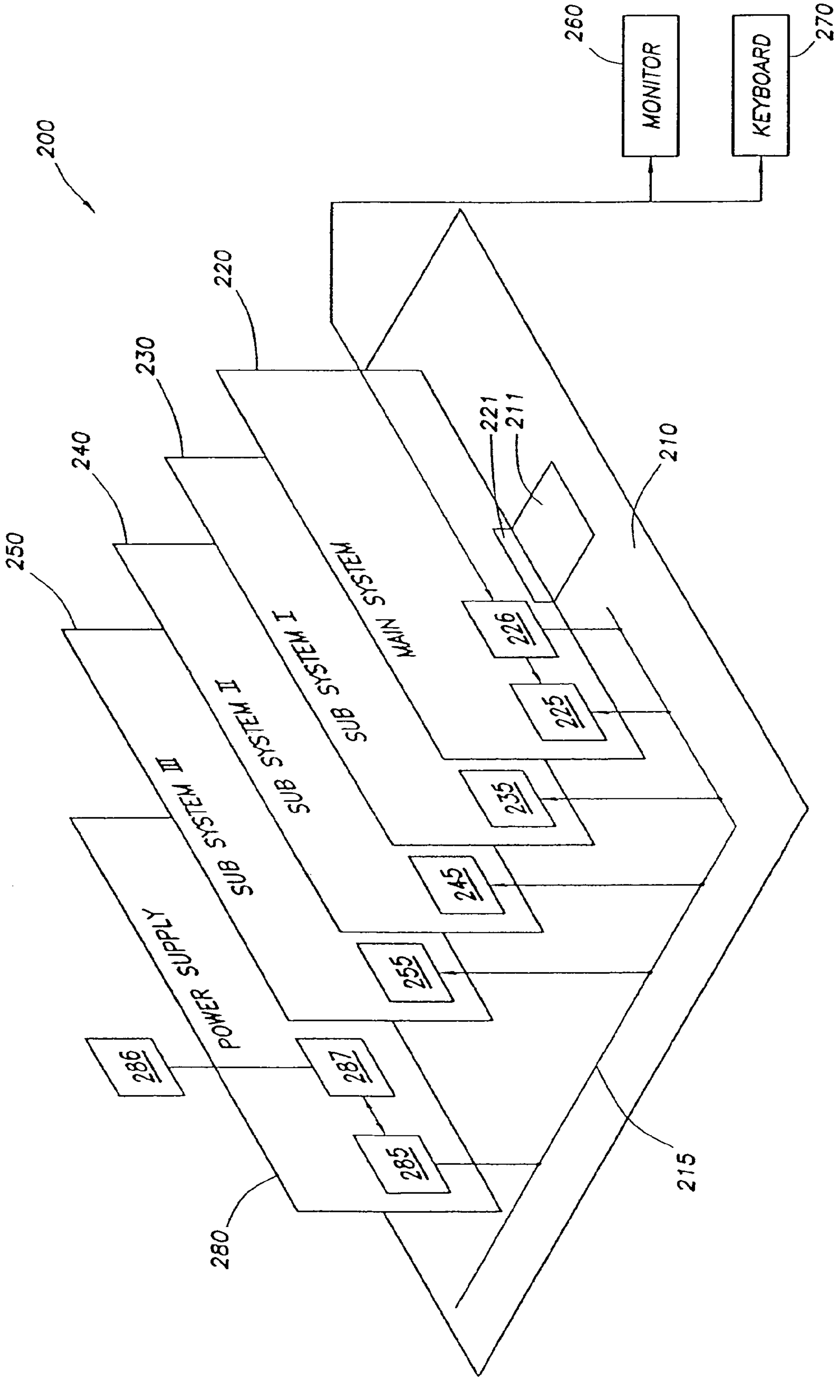
FIG. 2 is a block diagram of another exemplary embodiment according to the present invention.

FIG. 2 shows the concept of a backplane and a plurality of server systems and a power supply unit. The backplane 210 comprises preferably only connection buses and no active components. The power supply bus is shown with numeral 215 and a standard communication bus 211 can be implemented for communication and data exchange between the different systems. Backplane 210 can comprise one or more slots for each system for electrical connection and mechanical support of each system added to the backplane 210. For example, a main system 220 comprises a connection portion 221 for connection to a respective slot system on backplane 210. A voltage regulator module 225 is part of the main system and receives the respective supply voltage(s), for example, through the electrical connection 221. FIG. 2 only symbolically shows the connection of the voltage regulator module 225 with power supply bus 215. Each system can comprise a separate slot for the power supply or the main slot system carries all data signals and the power supply. A plurality of sub-systems 230, 240, 250 can be added. FIG. 2 shows 4 systems, however, depending on the design of the backplane more or less systems can be included. Each system comprises an associated voltage regulator module 235, 245, and 255, respectively. The power supply system comprises a voltage supply unit 285 for providing all necessary supply voltages and unidirectional as well as bi-directional control signals.

In a first embodiment, all systems 220, 230, 240, and 250 are similar or identical. Power supply unit 280 further comprises a power controller unit 287 coupled with the voltage supply unit and an external I/O unit 286, comprising, for example, a keypad and a display. Such a system operates identical to the above described.

In a second embodiment, power supply unit 280 does not comprise power controller unit 287 and I/O unit 286. However, power supply unit provides all necessary supply voltages and a stand-by voltage. Instead a main system 220 provides the functionality of the power controller unit 287 by means of a special control unit 226 which receives the stand-by supply voltage through power supply bus 215 and is coupled with keyboard 270. To this end, main system 220 may be coupled with a monitor 260 and a keyboard 270. Systems 230, 240, and 250 are configured as sub-systems.

Main system 220 can operate in two modes. In a first mode it is fully operational and in a second mode it operates in a sleep mode. During sleep mode, main system 220 does not receive the main supply and solely operates on the stand-by supply voltage to operate power controller unit 226. The sub-systems 230, 240, and 250 only receive the main supply voltage. If the system is turned off, power supply unit 280 only provides the stand-by supply voltage to main system 220. Main system 220 may have a limited functionality in the sleep mode. For example, main system 220 might only monitor activation of a specific key or key combination of keyboard 270. If a operator activates the specific key or key combination, main system 220 will signalize to power supply unit 280 to turn on the main supply voltage. Supply voltage bus now carries the main supply voltage. In a next step, main system 220 activates its own voltage regulator module and boots its main system. Once the main system operates it can control the power controller 226 or take over control of the power management. Main system can then provide specific menus on monitor 260 to activate or shut down the specific sub-systems of chassis 200 in the same way as described above.

Figure 3:
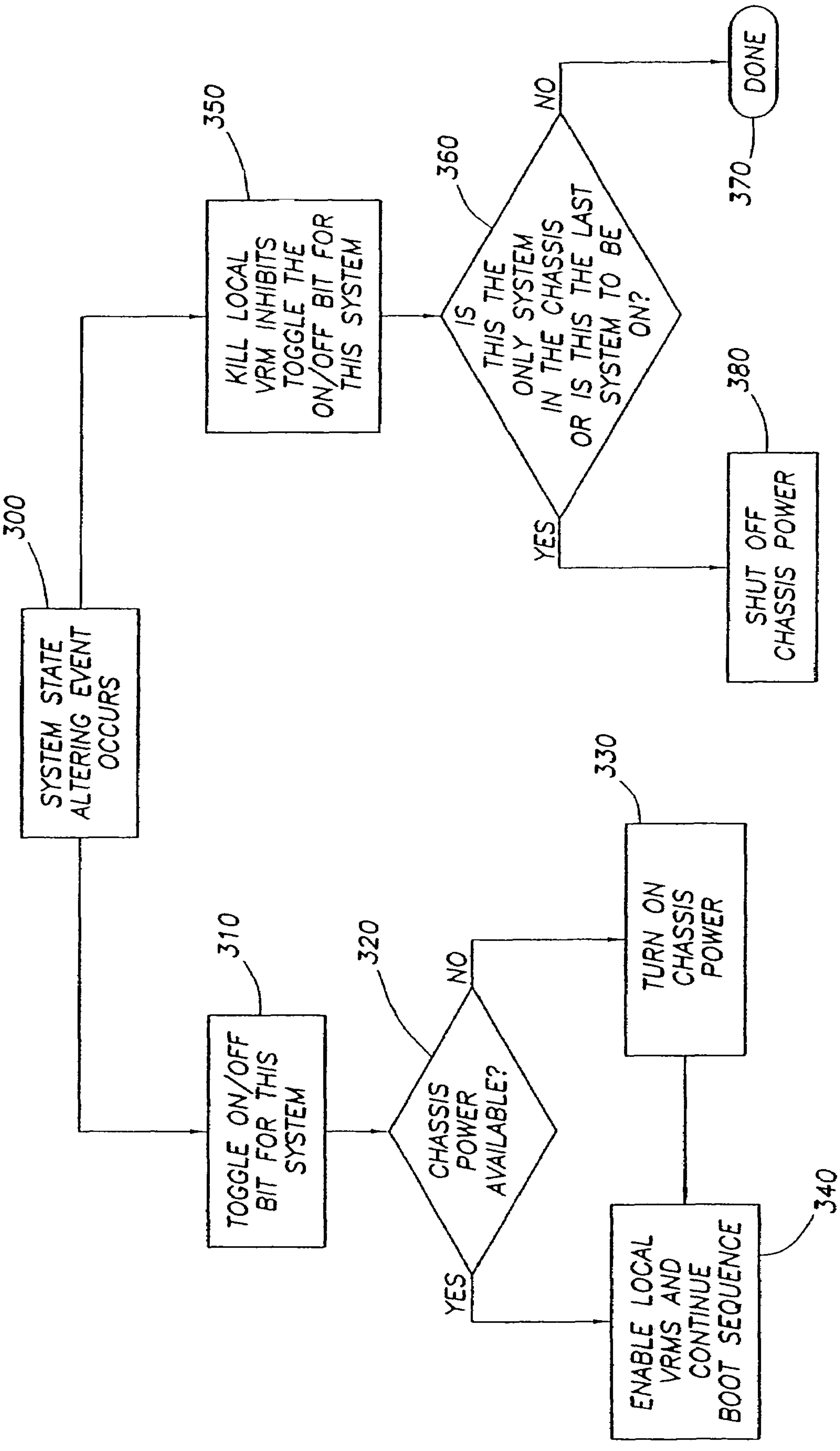
FIG. 3 is a flow chart showing a method to manage the power distribution according to one of the embodiments of the present invention.

FIG. 3 shows a flow chart of the principle power management according to the present invention. The power management monitors the system waiting for a respective event in step 300. If a turn on event occurs the routine branches to step 310 and toggles a respective bit to the ON state for a respective system. In step 320 the routine checks whether the power supply is active and provides the main supply voltage. If yes, the local voltage regulator module is enabled and the respective system will start a boot sequence in step 340. If not, the routine branches to step 330 in which the power supply unit is turned on and then follows up with step 340. When these steps are finished the routine goes back to step 300 waiting for the next event.

If a turn off event occurs, the system branches to step 350 in which the respective bit on/off bit is cleared and the local voltage regulator module is turned off. In step 360, the system then checks whether this was the last system active within the chassis. If yes, then in step 380 the power supply unit is turned off. If no, the routine returns to step 300 in step 370. Alternatively, as explained above, the routine can request a power down sequence from the respective system before step 350 and wait to proceed to step 350 until the respective system has shut down.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for operating an information handling system comprising a plurality of sub-systems including a voltage regulator module, a power supply unit for providing a main power supply and a stand-by power supply, and a power management controller, comprising:

upon a sub-system power on request:

determining whether the main power supply is available and if not, turning on the main power supply; and enabling the voltage regulator module of the respective sub-system; and upon a sub-system power off request:

turning off the voltage regulator module of the respective sub-system; and determining whether no other sub-system is enabled and if yes, then turning off the main power supply;

and repeating turning on or off for a pre-defined group of sub-systems, wherein within a sequence of turning off a group of sub-systems, stopping the sequence if a sub-system which has been shut down was the last active sub-system and turning off the main power supply.

2. The method for operating the information handling system of claim 1, wherein the power management controller further comprises an I/O unit.

3. The method for operating the information handling system of claim 2, wherein the I/O unit comprises a keypad and a display.

4. The method according to claim 1, wherein turning off the voltage regulator module comprises initiating a power down sequence for the respective sub-system.

5. The method according to claim 4, further comprising waiting until the power down sequence has been completed.

6. The method for operating an information handling system of claim 1, further comprising:

at the power management controller, receiving the standby power supply, wherein the power management controller controls the main power supply;

at each of the plurality of sub-systems, receiving the main power supply being controlled by the power management controller; and at each voltage regulator module of each sub-system, receiving a signal from and being controlled by the power management controller of a main system, wherein the main system comprises the power management controller.

7. The method for controlling power in the information handling system of claim 6, wherein the power management controller comprises a microcontroller.

8. The method for controlling power in the information handling system of claim 7, wherein the power management controller is coupled with a keyboard.

9. The method for controlling power in the information handling system of claim 8, wherein the power management controller monitors activity of the keyboard.

10. The method for controlling power in the information handling system of claim 6, further comprising coupling the power supply unit, the main system and the plurality of sub systems, wherein the information handling system further comprises a backplane for coupling.

11. The method for controlling power in the information handling system of claim 10, wherein the backplane comprises a power supply bus.

12. The method for controlling power in the information handling system of claim 6, wherein each sub system is a server.

* * * * *

UNITED STATES PATENT AND TRADEMARK OFFICE

CERTIFICATE OF CORRECTION

PATENT NO. : 7,636,862 B2
APPLICATION NO. : 11/401076
DATED : December 22, 2009
INVENTOR(S) : Kasprzak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this

Twenty-first Day of December, 2010

David J. Kappos

*Director of the United States Patent and Trademark Office*